United States Patent
Yeh et al.

(10) Patent No.: US 10,126,851 B2
(45) Date of Patent: Nov. 13, 2018

(54) IN-CELL TOUCH DISPLAY DEVICE AND OPERATING METHOD THEREOF

(71) Applicant: AU Optronics Corporation, Hsin-Chu (TW)

(72) Inventors: Pi-Chun Yeh, Hsin-Chu (TW); Ching-Sheng Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 326 days.

(21) Appl. No.: 15/046,952

(22) Filed: Feb. 18, 2016

(65) Prior Publication Data
US 2017/0123537 A1    May 4, 2017

(30) Foreign Application Priority Data
Oct. 28, 2015   (TW) .............................. 104135494 A

(51) Int. Cl.
G06F 3/045    (2006.01)
G06F 3/041    (2006.01)
G06F 3/044    (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/0412; G06F 3/0416; G06F 3/044
See application file for complete search history.

(56) References Cited

U.S. PATENT DOCUMENTS

2013/0314343 A1* 11/2013 Cho .................... G06F 3/0412
                                                                345/173
2013/0314369 A1* 11/2013 Liu .................... G06F 3/0412
                                                                345/174
(Continued)

FOREIGN PATENT DOCUMENTS

| CN | 103677427 A | 3/2014 |
| CN | 103943083 A | 7/2014 |
| TW | 201234338 | 8/2012 |

OTHER PUBLICATIONS

State Intellectual Property Office of the People's Republic of China, "Office Action", dated Dec. 29, 2017.

*Primary Examiner* — William Boddie
*Assistant Examiner* — Alecia D English
(74) *Attorney, Agent, or Firm* — WPAT, PC

(57) ABSTRACT

An in-cell touch display device includes an in-cell touch panel, a backlight module driving circuit, a backlight module, a gate driving circuit, a touch processing circuit and a control circuit. The in-cell touch panel includes a plurality of gate lines and a plurality of touch sensing units. The control circuit is used for defining a plurality of gate line driving periods separated from each other in the time and at least one touch sensing period in a frame period. The touch sensing period is between two adjacent gate line driving periods. During the gate line driving periods, the control circuit controls the gate driving circuit to drive the gate lines sequentially and outputs a signal to the backlight module driving circuit to turn on the backlight module. During each touch sensing period, the control circuit controls the touch processing circuit to output a driving signal to the touch sensing units and outputs a signal to the backlight module driving circuit to turn off the backlight module.

3 Claims, 3 Drawing Sheets

(56) References Cited

U.S. PATENT DOCUMENTS

2015/0370371 A1* 12/2015 Azumi .................... G06F 3/044
  345/174
2016/0266697 A1   9/2016  Cheng et al.
2017/0010731 A1   1/2017  Zhang et al.

* cited by examiner

IN-CELL TOUCH DISPLAY DEVICE AND OPERATING METHOD THEREOF

BACKGROUND

Technical Field

The present invention relates to a technology of display devices, and in particular, to an in-cell touch display device and operating methods thereof.

Related Art

There are two major technical development trends of touch display devices at present: an out-cell technology and an in-cell technology. In the out-cell technology, a display panel having no touch function is overlaid with a touch panel, while in the in-cell technology, a touch sensor is directly placed inside a pixel structure of a display panel. Compared with a touch display device using the out-cell technology, a touch display device using the in-cell technology has an advantage of thinner thickness.

In an in-cell touch display device, at least one touch sensing period is inserted in each frame period, and during each touch sensing period, while the gate driving operation is suspended, a gate potential level of a driving transistor in a shift register needs to be maintained for a preset period of time after the current touch sensing period, so that the shift register can generate a corresponding gate pulse according to the gate potential level of the driving transistor after the current touch sensing period ends. However, leakage exists along the plurality of transistors in the shift register; as a result, the gate potential and the gate pulse generated by the shift register is lower than a preset level, which causes a striped pattern problem on a frame.

SUMMARY

The present invention provides an in-cell touch display device, including an in-cell touch panel, a backlight module driving circuit, a backlight module, a gate driving circuit, a touch processing circuit, and a control circuit, where the in-cell touch panel includes a plurality of gate lines and a plurality of touch sensing units; the gate driving circuit is electrically coupled to the gate lines; the touch processing circuit is electrically coupled to the touch sensing units; the control circuit is electrically coupled to the gate driving circuit, the touch processing circuit, and the backlight module driving circuit; the control circuit defines a plurality of gate line driving periods separated from each other in the time and at least one touch sensing period in a frame period, and the touch sensing period is between two adjacent gate line driving periods; the control circuit controls the gate driving circuit to sequentially drive the gate lines and outputs a signal to the backlight module driving circuit to turn on the backlight module in the gate line driving periods; and the control circuit controls the touch processing circuit to output a driving signal to the touch sensing units and outputs a signal to the backlight module driving circuit to turn off the backlight module in the at least one touch sensing period.

The present invention further provides an operating method for an in-cell touch display device, where the in-cell touch display device includes an in-cell touch panel, a gate driving circuit, a touch processing circuit, a backlight module driving circuit, and a backlight module, the in-cell touch panel includes a plurality of gate lines and a plurality of touch sensing units, the gate lines are electrically coupled to the gate driving circuit, and the plurality of touch sensing units is electrically coupled to a touch processing circuit; and the operating method includes: defining a plurality of gate line driving periods separated from each other in the time and at least one touch sensing period in a frame period, where the touch sensing period is between two adjacent gate line driving periods; then driving the gate lines sequentially through the gate driving circuit and outputting a signal to the backlight module driving circuit to turn on the backlight module in the gate line driving periods; and then outputting a driving signal to the touch sensing units through the touch processing circuit, turning off the backlight module through the backlight module driving circuit, and controlling the gate driving circuit to temporarily stop driving the gate lines in the at least one touch sensing period.

According to the in-cell touch display device of the present invention, a control circuit is used to define a plurality of gate line driving periods separated from each other in the time and at least one touch sensing period in a frame period, and the touch sensing period is between two adjacent gate line driving periods. Moreover, the control circuit drives gate lines sequentially through a gate driving circuit and turns on a backlight module through a backlight module driving circuit in the gate line driving periods. In addition, the control circuit controls a touch processing circuit to output a driving signal to all touch sensing units, outputs a signal to the backlight module driving circuit to turn off the backlight module, and controls the gate driving circuit to temporarily stop driving the gate lines in each touch sensing period. Therefore, each time the in-cell touch display device operates in a touch sensing period, although a level of a gate of a driving transistor in a shift register that corresponds to the first gate line driven after the current touch sensing period and is in a gate driving circuit of the in-cell touch display device needs to be maintained for a preset period of time, transistors in the shift register at this stage lack illumination due to turn-off of the backlight module within the preset period of time, and therefore has a small leakage current. Therefore, a potential at the gate of the driving transistor in the shift register at this stage decreases slowly without much change in the preset period of time. In this way, a high level of a gate pulse generated by the shift register at this stage can be maintained at a preset level, and therefore, a striped pattern problem of the in-cell touch display device can be alleviated.

DETAILED DESCRIPTION

Figure 1:
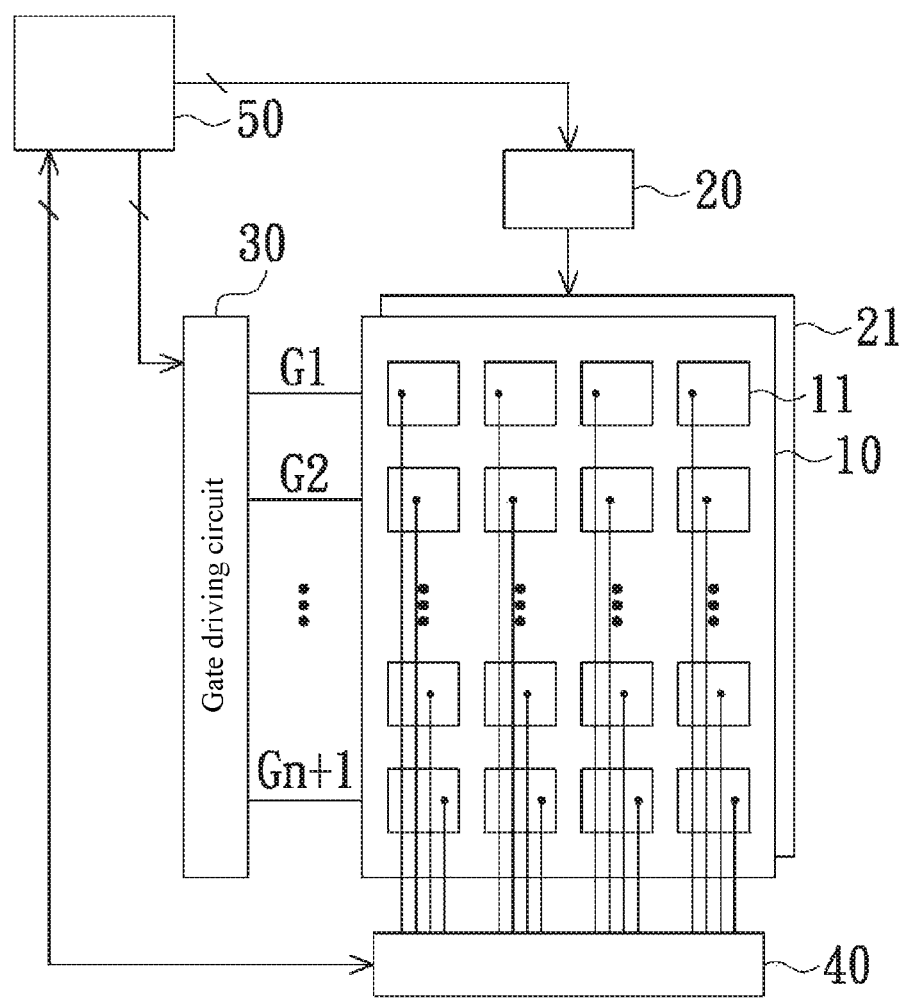
FIG. 1 is a schematic diagram of an in-cell touch display device according to an embodiment of the present invention.

Refer to FIG. 1, which is a schematic diagram of an in-cell touch display device according to an embodiment of the present invention. An in-cell touch display device 100 includes an in-cell touch panel 10, a backlight module driving circuit 20, a backlight module 21, a gate driving circuit 30, a touch processing circuit 40, and a control circuit 50. The in-cell touch panel 10 includes a plurality of gate lines G1 to Gm and a plurality of touch sensing units (as shown by label 11). The gate driving circuit 30 is electrically coupled to the gate lines G1 to Gm. The touch processing circuit 40 is electrically coupled to each touched sensing unit 11. The control circuit 50 is electrically coupled to the gate driving circuit 30, the touch processing circuit 40, and the backlight module driving circuit 20.

The control circuit 50 can control the touch processing circuit 40 to output a driving signal to all the touch sensing units 11, and the driving signal returns to the touch processing circuit 40 after passing through the touch sensing units 11. In this way, the touch processing circuit 40 can sense whether the touch sensing units 11 are touched by an object.

In some embodiments, the touch processing circuit 40 of the in-cell touch display device in the present invention may use a self-capacitance touch sensing technology.

The backlight module driving circuit 20 is configured to drive the backlight module 21, which shows a correspondence between the backlight module 21 and the in-cell touch panel 10. The backlight module 21 is not limited to a specific type, and may use an edge lighting structure or a bottom lighting structure. The backlight module is well known to a person of ordinary skill in the art and is therefore not described herein again.

Figure 2:
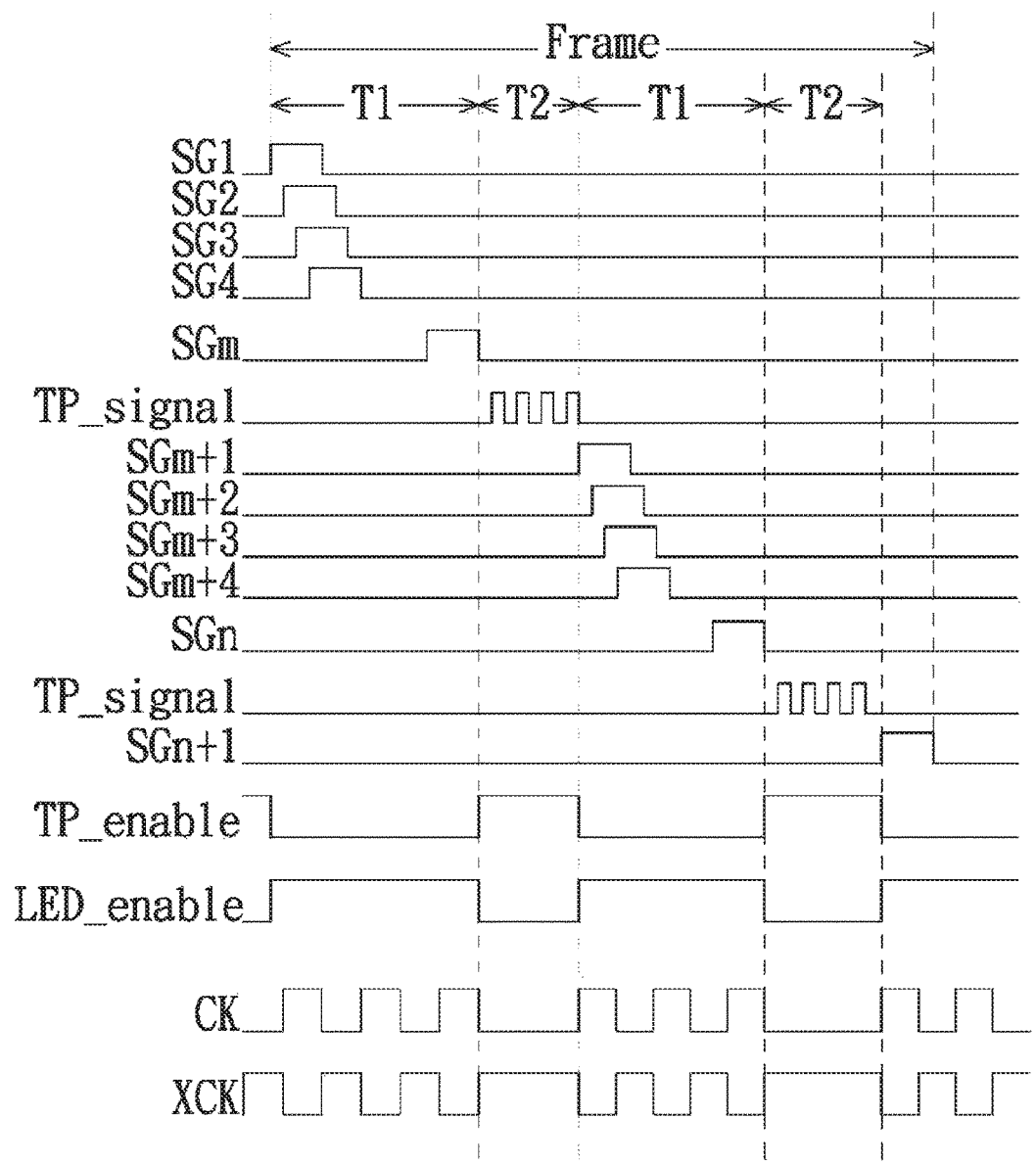
FIG. 2 is a schematic diagram of an action sequence of an in-cell touch display device according to an embodiment of the present invention.

FIG. 2 is a schematic diagram of an action sequence of an in-cell touch display device according to an embodiment of the present invention. Driving sequences (separately indicated by SG1 to SGm, SGm+1 to SGn, and SGn+1, in this embodiment the shift register is formed by the N-MOS type transistors, the high level gate driving signal will turn-on the transistor and the low level gate driving signal to turn off the transistor. If the shift register t is formed by the PMOS-Type transistors, the high level gate driving signal will turn-off the transistor and the low level gate driving signal to turn on the transistor.) of gate lines G1 to Gm, Gm+1 to Gn, and Gn+1 in the in-cell touch display device of the present invention within a frame period (as shown by label Frame), a sequence TP_enable of a driving signal output by the touch processing circuit 40, an operating sequence TP_signal of the touch sensing signal, and an action sequence LED_enable of the backlight module driving circuit 20 can be seen herein. Frequency of the touch sensing signal output by the touch processing circuit 40 is higher than driving frequency of the gate lines G1 to Gm, Gm+1 to Gn, and Gn+1.

Referring to FIG. 1 and FIG. 2, the control circuit 50 is configured to define a plurality of gate line driving periods T1 separated from each other in the time and at least one touch sensing period T2 in the same frame period, and the touch sensing period T2 is between two adjacent gate line driving periods T1. The control circuit 50 controls the gate driving circuit 30 to drive the gate lines G1 to Gm, Gm+1 to Gn, and Gn+1 sequentially and outputs a signal to the backlight module driving circuit 20 to turn on the backlight module 21 in the gate line driving periods T1. In addition, the control circuit 50 controls the touch processing circuit 40 to output a driving signal to all the touch sensing units 11, outputs a signal to the backlight module driving circuit 20 to turn off the backlight module 21, and controls the gate driving circuit 30 to temporarily stop driving the gate lines G1 to Gm, Gm+1 to Gn, and Gn+1 in the touch sensing period T2.

That is, each time the touch processing circuit 40 outputs a driving signal, the control circuit 50 controls the backlight module driving circuit 20 to turn off the backlight module 21, and controls the gate driving circuit 30 to temporarily stop driving the gate lines G1 to Gm, Gm+1 to Gn, and Gn+1.

In addition, each time the control circuit 50 determines that a current touch sensing period T2 is followed by a gate line driving period T1, the control circuit 50 controls the gate driving circuit 30 to continue to drive the gate lines G1 to Gm, Gm+1 to Gn, and Gn+1 when the current touch sensing period T2 ends.

Figure 3:
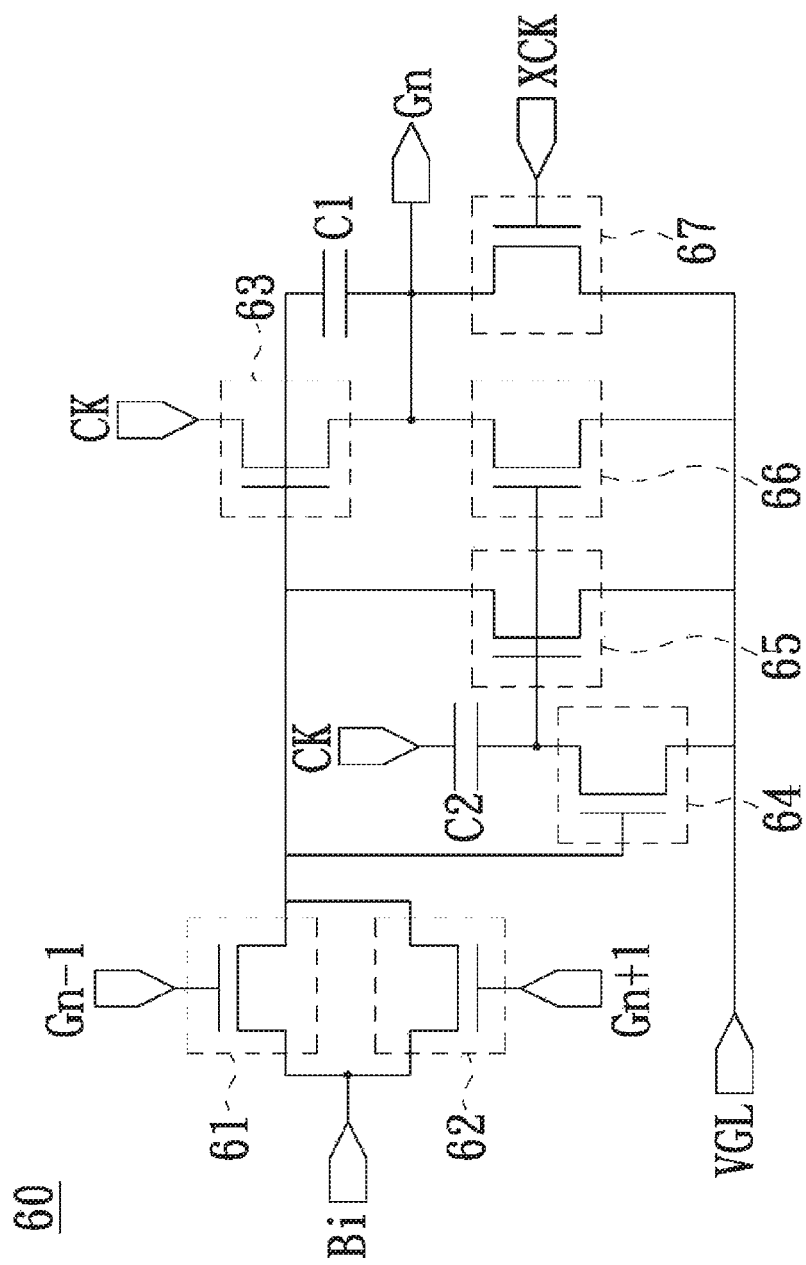
FIG. 3 is a schematic diagram of a shift register according to an embodiment of the present invention.

The foregoing gate driving circuit 30 includes a plurality of shift registers connected in series and the output of each shift register is coupled to a input of the next stage shift register (not shown). An output end of each shift register is not only electrically coupled to one of the gate lines G1 to Gm, Gm+1 to Gn, and Gn+1 but also electrically coupled to input end Bi of the next stage shift register. FIG. 3 is a schematic diagram of a shift register according to an embodiment of the present invention. An architecture of a shift register 60 shown in FIG. 3 is merely an example, and the in-cell touch display device 100 of the present invention may also be used in combination with shift registers in other forms.

Referring to FIG. 3, the shift register 60 includes a first transistor 61, a second transistor 62, a third transistor 63 (used as a driving transistor), a fourth transistor 64, a fifth transistor 65, a sixth transistor 66, a seventh transistor 67, a first capacitor C1, and a second capacitor C2. In this example, each of the first transistor 61 to the seventh transistor 67 is implemented as an N-type transistor, but the present invention is not limited thereto.

The first transistor 61 is provided with a first terminal, a second terminal, and a first control terminal. The first terminal is configured to receive an input signal Bi, wherein the input signal Bi may be came from a system board or came from the previous stage shift register output signal Gn−1, and the first control terminal is electrically coupled to a gate line Gn−1 to receive a gate pulse generated by a shift register at a previous stage. The second transistor 62 is provided with a third terminal, a fourth terminal, and a second control terminal. The third terminal is configured to receive an input signal Bi, the fourth terminal is electrically coupled to the second terminal, and the second control terminal is electrically coupled to the gate line Gn+1 to receive a gate pulse generated by a shift register at a next stage.

The third transistor 63 is provided with a fifth terminal, a sixth terminal, and a third control terminal. The third control terminal is electrically coupled to the second terminal, the fifth terminal is configured to receive a frequency signal CK, and the sixth terminal is electrically coupled to an output end of the shift register to output a gate pulse Gn. The first capacitor C1 is electrically coupled between the second terminal and the output end. One end of the second capacitor C2 is configured to receive a frequency signal CK. The fourth transistor 64 is provided with a seventh terminal, an eighth terminal, and a fourth control terminal. The seventh terminal is electrically coupled to the other end of the second capacitor, the eighth terminal is electrically coupled to a reference potential VGL, and the fourth control terminal is electrically coupled to the second terminal.

The fifth transistor 65 is provided with a ninth terminal, a tenth terminal, and a fifth control terminal. The ninth terminal is electrically coupled to the second terminal, the tenth terminal is electrically coupled to the reference potential VGL, and the fifth control terminal is electrically coupled to the seventh terminal. The sixth transistor 66 is provided with an eleventh terminal, a twelfth terminal, and a sixth control terminal. The eleventh terminal is electrically coupled to the output end, the twelfth terminal is electrically coupled to the reference potential VGL, and the sixth control terminal is electrically coupled to the seventh terminal.

The seventh transistor 67 is provided with a thirteenth terminal, a fourteenth terminal, and a seventh control terminal. The thirteenth terminal is electrically coupled to the output end, the fourteenth terminal is electrically coupled to the reference potential VGL, and the seventh control terminal is configured to receive a frequency signal XCK, where the frequency signal CK and the frequency signal XCK are inverted signals of each other.

FIG. 3 only shows a shift register at one stage, and for shift registers at two neighboring stages that are connected in series with the shift register, a frequency signal XCK is received instead of a frequency signal CK, and a frequency signal CK is received instead of a frequency signal XCK. That is, a manner used for a shift register at an even-number stage to be electrically coupled to a frequency signal CK and a frequency signal XCK is opposite a manner used for a shift register at an odd-number stage to be electrically coupled to a frequency signal CK and a frequency signal XCK.

Refer to FIG. 2 and FIG. 3, as can be known from the two figures, during each T2 period the control circuit 50 controls the gate driving circuit 30 to temporarily stop driving the gate lines G1 to Gm, Gm+1 to Gn, and Gn+1. In one embodiment, the gate lines is maintaining a frequency signal CK and a frequency signal XCK that are received by a shift register corresponding to the first gate line (for example, the gate line Gm+1) during the touch sensing period T2 at a first level (for example, a low level) and a second level (for example, a high level) respectively. In this way, the shift register 60 at this stage as shown in FIG. 3 and all shift registers at following stages temporarily stop outputting a gate pulse, thereby achieving the objective of temporarily stopping driving the gate lines G1 to Gm, Gm+1 to Gn, and Gn+1. In addition, frequency of the driving signal output by the touch processing circuit 40 is larger than frequency of the frequency signal CK and frequency of the frequency signal XCK.

As can be known from the above, each time the in-cell touch display device 100 operates in a touch sensing period T2, a gate potential level of a driving transistor in a shift register after the current touch sensing period T2 needs to be maintained for a preset period of time; since transistors in the shift register at this stage lack illumination due to turn-off of a backlight module within the preset period of time, and the leakage current is minimized. Hence, a gate potential level of the driving transistor in the shift register at this stage decreases slowly without much change in the preset period of time. In this way, a more accurate level of a gate pulse generated by the shift register at this stage can be maintained at a preset level, and therefore, a striped pattern problem of the in-cell touch display device can be alleviated.

On the basis of the above, according to the in-cell touch display device of the present invention, a control circuit 50 is used to define a plurality of gate line driving periods separated from each other in time and at least one touch sensing period in the same frame period, and the touch sensing period is between two adjacent gate line driving periods. Moreover, the control circuit 50 drives gate lines sequentially through a gate driving circuit 30 and outputs a signal to a backlight module driving circuit 20 to turn on a backlight module 21 in the gate line driving periods T1. In addition, the control circuit 50 controls a touch processing circuit 40 to output a touch sensing driving signal to all touch sensing units 11, meanwhile, the control circuit 50 outputs a signal to the backlight module driving circuit 20 to turn off the backlight module 21, and controls the gate driving circuit 30 to temporarily stop driving the gate lines in the at least one touch sensing period T2.

Therefore, whenever the in-cell touch display device operates in a touch sensing period T2, the loss of the gate potential level of a driving transistor in a shift register during the touch sensing period T2 is minimized by turning off the backlight module 21 during the period T2. Therefore, the gate potential of the driving transistor in the shift register during T2 decreases slowly without much change. In this way, a more accurate level of a gate pulse generated by the shift register at this stage can be maintained at a preset level, and therefore, a striped pattern problem of the in-cell touch display device can be alleviated.

Preferred embodiments of the present invention are disclosed above, but are not intended to limit the present invention. A person skilled in the art may make various modifications and variations without departing from the spirit and scope of the present invention. Therefore, the protection scope of the present invention shall be subject to the appended claims.

What is claimed is:

1. An in-cell touch display device, comprising:
   an in-cell touch panel including a plurality of gate lines and a plurality of touch sensing units;
   a backlight module;
   a backlight module driving circuit, electrically coupled to the backlight module;
   a gate driving circuit, electrically coupled to the gate lines;
   a touch processing circuit, electrically coupled to the touch sensing units; and
   a control circuit, electrically coupled to the backlight module driving circuit, the gate driving circuit, the touch processing circuit, and the backlight module, wherein said control circuit defines a first gate line driving period and a first touch sensing period within a frame, said first touch sensing period is adjacent to said first gate line driving period, and said control circuit controls the gate driving circuit to drive the gate lines sequentially and controls the backlight module driving circuit to turn on the backlight module during said first gate line driving period, and said control circuit controls the touch processing circuit to drive the touch sensing units and controls the backlight module driving circuit to turn off the backlight module during said first touch sensing period;
   wherein the gate driving circuit comprises a first shift register, a second shift register, and a third register connected in series, an output end of each shift register is electrically coupled to one of the gate lines, each of the shift registers receives a first frequency signal and a second frequency signal, said first frequency signal is inverted from said second frequency signal, and the control circuit controls the gate driving circuit to temporarily stop driving the gate lines by maintaining said first frequency signal at a first level and said second frequency signal at a second level; wherein
   said second shift register comprises:
      a first transistor, provided with a first terminal, a second terminal, and a first control terminal, wherein the first terminal is configured to receive an input signal, and the first control terminal is configured to receive a gate pulse generated by said first shift register;
      a second transistor, provided with a third terminal, a fourth terminal, and a second control terminal, wherein the third terminal is configured to receive an input signal, the fourth terminal is electrically coupled to the second terminal, and the second control terminal is configured to receive a gate pulse generated by said third shift register;

a third transistor, provided with a fifth terminal, a sixth terminal, and a third control terminal, wherein the fifth terminal is configured to receive either of the first frequency signal and the second frequency signal, the sixth terminal is electrically coupled to an output end of the shift register, and the third control terminal is electrically coupled to the second terminal;

a first capacitor, electrically coupled between the second terminal and the output end;

a second capacitor, wherein one end of the second capacitor is configured to receive a signal, which is the same as the signal received by the fifth terminal, of the first frequency signal and the second frequency signal;

a fourth transistor, provided with a seventh terminal, an eighth terminal, and a fourth control terminal, wherein the seventh terminal is electrically coupled to the other end of the second capacitor, the eighth terminal is electrically coupled to a reference potential, and the fourth control terminal is electrically coupled to the second terminal;

a fifth transistor, provided with a ninth terminal, a tenth terminal, and a fifth control terminal, wherein the ninth terminal is electrically coupled to the second terminal, the tenth terminal is electrically coupled to the reference potential, and the fifth control terminal is electrically coupled to the seventh terminal;

a sixth transistor, provided with an eleventh terminal, a twelfth terminal, and a sixth control terminal, wherein the eleventh terminal is electrically coupled to the output end, the twelfth terminal is electrically coupled to the reference potential, and the sixth control terminal is electrically coupled to the seventh terminal; and a seventh transistor, provided with a thirteenth terminal, a fourteenth terminal, and a seventh control terminal, wherein the thirteenth terminal is electrically coupled to the output end, the fourteenth terminal is electrically coupled to the reference potential, and the seventh control terminal is configured to receive a signal, which is different from the signal received by the fifth terminal, of the first frequency signal and the second frequency signal.

2. The in-cell touch display device according to claim 1, wherein when said control circuit determines that said first touch sensing period is followed by a second gate line driving period, the control circuit controls the gate driving circuit to drive the gate lines when said first touch sensing period ends.

3. The in-cell touch display device according to claim 1, wherein frequency of the driving signal is larger than frequency of the first frequency signal and frequency of the second frequency signal.

\* \* \* \* \*